May 15, 1962
J. M. MACY ETAL
3,034,741
SPINNING REEL
Filed June 24, 1957
4 Sheets-Sheet 1
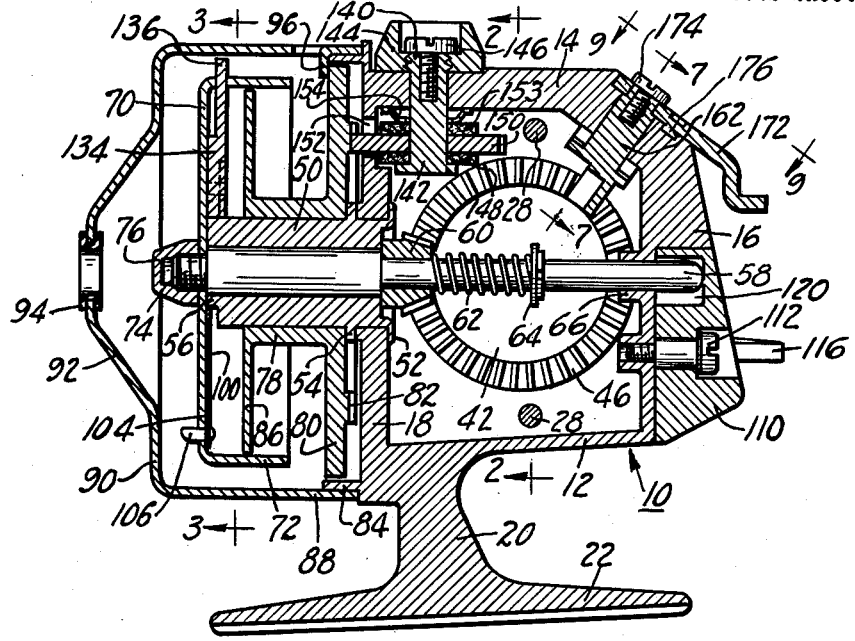
Fig.1
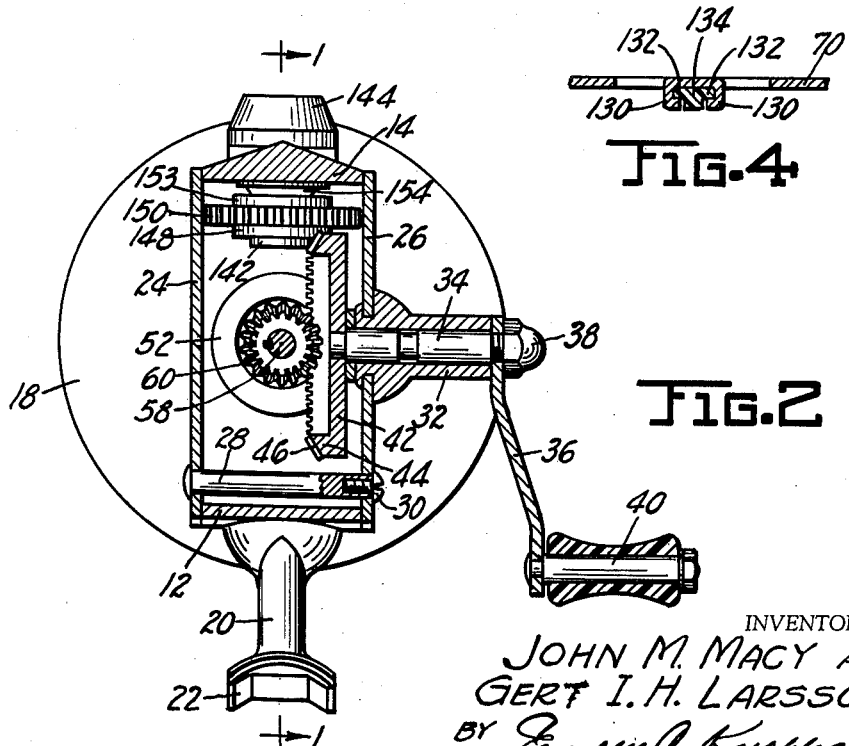
Fig.4
Fig.2
INVENTORS.
JOHN M. MACY AND
GERT I. H. LARSSON,
BY Eugene C. Knoblock
ATTORNEY

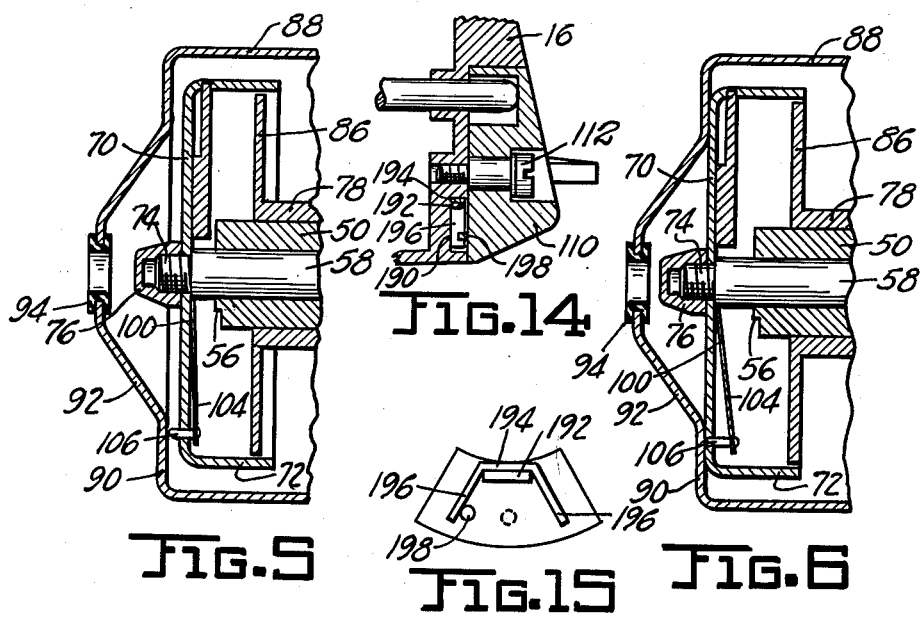
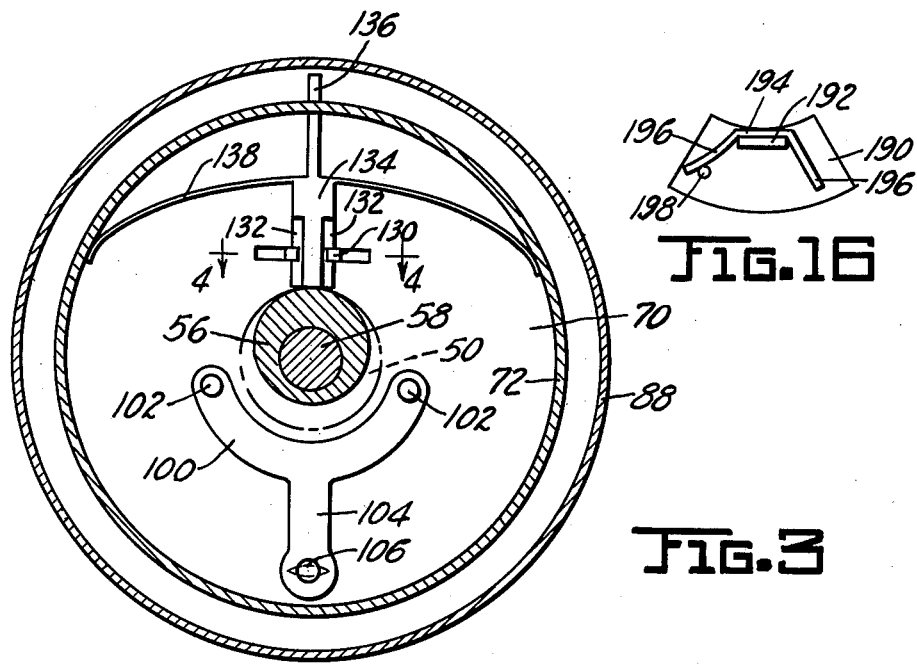

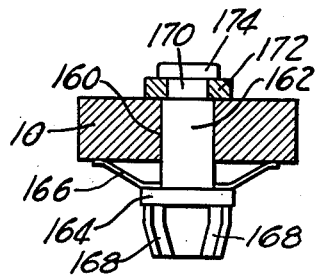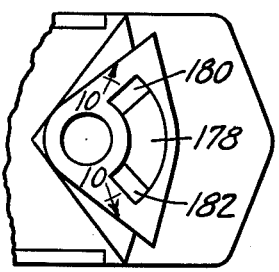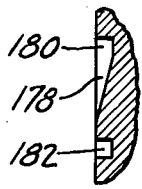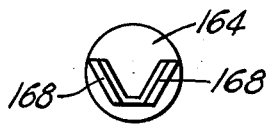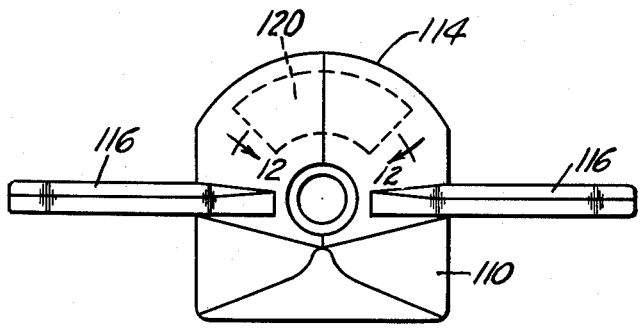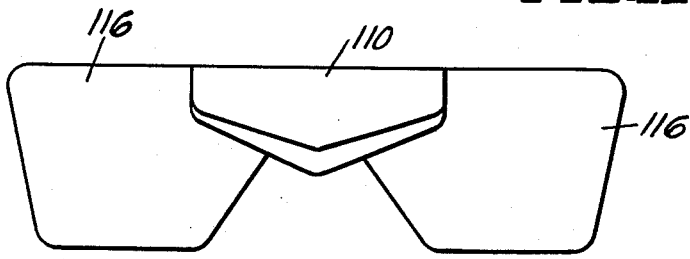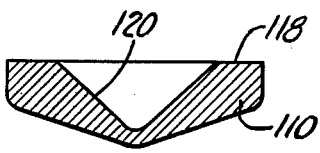

May 15, 1962  J. M. MACY ETAL  3,034,741
SPINNING REEL

Filed June 24, 1957  4 Sheets-Sheet 4

JOHN M. MACY AND
GERT I. H. LARSSON.
INVENTORS

BY
Eugene C. Knoblock
ATTORNEY

United States Patent Office 3,034,741
Patented May 15, 1962

3,034,741
SPINNING REEL
John M. Macy and Gert I. H. Larsson, South Bend, Ind., assignors to South Bend Tackle Company, Inc., South Bend, Ind., a corporation of Indiana
Filed June 24, 1957, Ser. No. 667,480
10 Claims. (Cl. 242—84.2)

This invention relates to improvements in fishing reels, and more particularly to a reel of the spinning type having a rotating spool whose axis is parallel to the direction of the cast.

The primary object of this invention is to provide a novel and simple fishing reel construction which can be manipulated accurately and easily by a user holding the same in either the right hand or the left hand, which can be converted readily from operation by the right hand to operation by the left hand, and which has provision for accurate adjustment of parts.

A further object is to provide a reel of this character with a novel construction and arrangement of parts to retract a line pick-up pin and to restrict and control the rate of line discharge during casting through a wide range and which permits fingering to accurately control the extent of restriction of line discharge for feathering purposes, whereby to provide accuracy of casting with a fine degree of control and "feel" of the operation of the reel by the user, said fingering mechanism having adequate leverage for fine variations of fingering adjustment.

A further object is to provide a reel of this character with a novel friction clutch or drag mechanism which is completely confined so as to avoid wetting of the friction members employed therein and hence permit the maintenance of a constant value of friction for any given setting, which has a wide range of adjustment with high accuracy, which does not prevent the engagement of gear teeth at different adjustments, which does not tend to bind the spool of the reel, and which provides multiple bearing surfaces so oriented as to stabilize the spool and accommodate free rotation thereof.

A further object is to provide a reel with a novel line feathering drag which is of simple construction and is mounted upon a rotatable pick-up member and is shiftable axially therein to yieldably engage an outer housing in the path of discharge of a line in casting and which exerts a restriction to line discharge varying according to the degree of flexure of a simple spring.

A further object is to provide a reel of this character having novel anti-reverse construction which is well placed for operation by a finger of the hand of the user which holds the rod on which the reel is mounted, which accommodates anti-reverse action in both right hand and left hand settings, and which accommodates a one-way click action in selected direction of rotation.

Other objects will be apparent from the following specification.

In the drawings:

FIG. 1 is a longitudinal sectional view of the reel taken on line 1—1 of FIG. 2;

FIG. 2 is a transverse sectional view of the reel taken on line 2—2 of FIG. 1;

FIG. 3 is a transverse sectional view of the reel taken on line 3—3 of FIG. 1;

FIG. 4 is a detail sectional view taken on line 4—4 of FIG. 3;

FIG. 5 is a fragmentary longitudinal sectional view illustrating the parts in a different adjustment than in FIG. 1 to control line feathering when casting;

FIG. 6 is a view similar to FIG. 5 but illustrating the parts in a different adjustment to provide a positive drag resistance to discharge of a line from the reel;

FIG. 7 is a sectional detail view taken on line 7—7 of FIG. 1;

FIG. 8 is an end view of a part of the construction shown in FIG. 7 as viewed from the bottom of FIG. 7;

FIG. 9 is a fragmentary outer face view of the housing of the reel as viewed in the direction of the arrow 9 in FIG. 1, with the finger member removed;

FIG. 10 is a fragmentary sectional view taken on line 10—10 of FIG. 9;

FIG. 11 is a rear face view of the cam actuator for the reel spool and its shaft;

FIG. 12 is a sectional view taken on line 12—12 of FIG. 11;

FIG. 13 is a top view of the cam actuator;

FIG. 14 is a fragmentary longitudinal sectional view illustrating a modification of the invention;

FIG. 15 is a fragmentary schematic detail view taken from the right in FIG. 14 with the cam actuator removed;

FIG. 16 is a fragmentary schematic detail view similar to FIG. 15 with the parts in a different adjustment;

Figure 17:
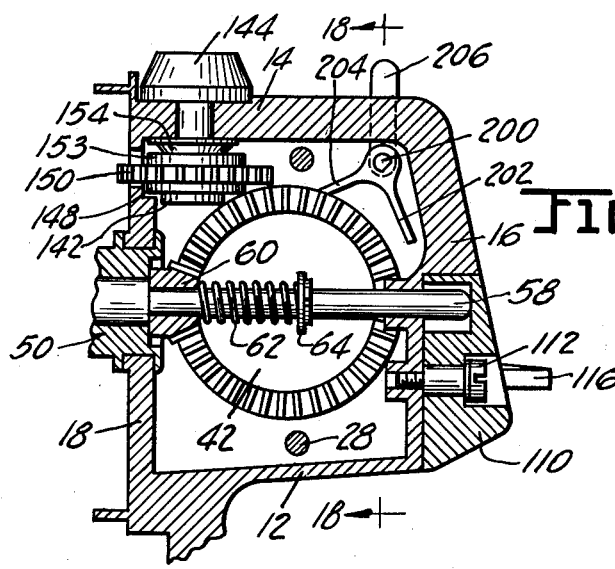
FIG. 17 is a fragmentary sectional view illustrating a modification of the invention and taken on line 17—17 of FIG. 18.

Referring to the drawings, and particularly to FIGS. 1 to 13, which illustrate one embodiment of the invention, the numeral 10 designates the body casting or the frame of the reel which has a bottom wall 12, a top wall 14, a rear wall 16, a front wall 18, a supporting leg 20, and the usual elongated foot portion 22 adapted to bear against the reel seat of a fishing rod and which is of arched cross-section with its concave face lowermost. The front wall 18 is preferably circular and the top, bottom and rear walls are preferably narrow compared to said front wall and lie within the overall outline of the circular front wall 18, as best seen in FIG. 2. The sides of the frame are open and are adapted to be spanned by side plates 24 and 26 removably mounted thereon by any suitable securing means. Thus post members 28, passing through apertures in plates 24 and 26 and having a head at one end bearing against the outer face of one of the plates and a screw-threaded socket at its other end adapted to receive an anchoring screw 30, may be provided to draw the plates 24 and 26 in tight frictional engagement with the opposite side edges of the frame walls, as illustrated in FIG. 2.

The plate 26 has an opening therein which serves to mount a bushing sleeve 32 in fixed relation thereto. A crank shaft 34 is journaled in the sleeve 32 and carries at one end a crank arm 36 detachably secured thereto by a nut 38 threaded on shaft 34. Crank arm 36 carries a projecting handle 40 at its free end. The opposite end of the shaft 34 is positioned inwardly of the plate 26 in use, as shown, and carries a gear of substantially cup-shape having a disk part 42 and a gear ring 44 projecting from said disk and provided with beveled gear teeth 46. Plates 24 and 26 are similar and may be positioned at either side of the frame, thus making it possible for the crank to be either a right-hand crank, as illustrated, or a left-hand crank.

The front wall 18 of the frame has a central opening within which is anchored a bushing tube 50 by a rear marginal flange 52 thereof bearing against the inner face of the wall 18 around the opening and an annular rib 54 thereof bearing against the front face of the wall 18 around the opening. The bushing 50 projects forwardly and perpendicularly from the front wall 18 and terminates in an eccentric outer end portion of circular cross-section defining a crescent shaped shoulder 56. The bushing 50 has slidably journaled therein the forward end portion of a main shaft 58. The rear or inner end portion of the shaft 58 is of smaller diameter than its forward portion and has splined and slidable thereon a pinion 60 adapted to mesh with the gear teeth 46 to be driven thereby. A coil spring 62 surrounds the shaft 58 and bears at one end against an abutment 64 fixed on the shaft 58 and at its opposite end bears against the end of the pinion 60 to normally press the same into engagement with the bushing 50. The rear portion of the shaft 58 projects rotatably and slidably through a journal 66 carried by the rear wall 16 at a reduced thickness portion thereof.

A cup-shaped member or cone is mounted upon the projecting front end of the shaft 58 and preferably constitutes a circular or disk portion 70 and a cylindrical skirt portion 72 projecting rearwardly from the part 70. The forward end of the shaft 58 has a reduced dimension threaded part 74 defining a shoulder against which the disk 70 bears, and a nut 76 is screw-threaded on the part 74 to anchor the cone disk in fixed position upon the shaft.

A spool has a hub portion 78 journaled upon the bushing 50, a rear disk 80 bearing against the bushing flange 54 and a front disk 86. The disk 80 fits with slight rotative clearance within a cylindrical flange 84 projecting forwardly from the margin of the front wall 18, and carries an annular gear 82 confronting the wall 18. The front disk or wall 86 of the spool is of a diameter to have a snug sliding fit within the cone skirt 72.

A cup-shaped sheath or housing encircles the cone and the spool, having a cylindrical skirt portion 88 mounted upon the cylindrical flange 84 and an end wall. The housing end wall has a substantially flat marginal portion 90 and a frusto conical central portion 92, and has a central opening axially aligned with the shaft 58 and lined by a grommet 94. The inner diameter of the flat marginal end wall portion 90 is smaller than the diameter of the end disk 70 of the cone and is normally spaced therefrom a substantial distance, as illustrated in FIG. 1, as a result of the action of the spring 62 retracting the cone.

In the retracted position of the cone, the free edge of the skirt portion 72 thereof will be positioned substantially centrally between the spool end walls 80 and 86. Also, as seen in FIG. 1, the skirt 72 of the cone will have substantial clearance within the cylindrical sheath portion 88. The cylindrical portion 88 of the sheath preferably has a plurality of circumferentially spaced lips 96 struck therefrom and inturned to overlie the margin of the spool disk 80, as illustrated at the top in FIG. 1.

The wall 70 of the cone carries a leaf spring normally bearing against the inner face thereof and preferably of the shape illustrated in FIG. 3, characterized by a substantially arcuate yoke part 100 arranged substantially concentric with the shaft 58 and anchored fixedly to the wall 70 by securing members 102 at its opposite side. A central substantially radially projecting spring leaf part 104 carries a pin 106 at its free end which projects freely through an aperture in the wall 70. The free outer end of the pin 106 may be rounded or tapered, as shown. The pin 106 is clear of or spaced from wall 90 in the FIG. 1 position and engages the wall 90 when the shaft 58 is urged axially outwardly to the position shown in FIG. 5. Further outward endwise shifting of the shaft 58 to the position shown in FIG. 6 brings the cone wall 70 into frictional engagement with the inner face of the marginal portion of the wall 90 and deflects the spring 100, 104.

A cam member 110 seats in the recessed portion of the rear body wall 16 through which the rear end of the shaft 58 projects, being pivotally mounted at that position by pivot pin 112 screw-threaded in said casing wall. The upper edge 114 of the cam 110 is arcuate and concentric with the pivot pin 112 and the top edge of the recess in the wall 16 is similarly arcuate to rockably receive the cam 110. The cam 110 is preferably of a width to extend completely across the back body wall 16, and a pair of ears or wings 116 project therefrom at opposite sides thereof to extend beyond the sides of the casing. Wings 116 are arranged so that one thereof will be within convenient reach of the thumb of the same hand of the user which grips the rod upon which the reel is mounted. The inner surface 118 of the cam 110 has a cam groove 120 formed therein, so positioned as to receive the rear end portion of the shaft 58. The end of the shaft 58 is preferably rounded to ride smoothly within that groove, as illustrated in FIG. 1. The cam groove 120 is arcuate and concentric with the pivot axis of the cam, as best seen in FIG. 11. The cam groove 120 is of greatest depth at its center and its depth progressively decreases from its center toward its ends, as seen in FIG. 12. Thus the cam 110 provides conveniently accessible means for advancing the shaft 58 endwise against the action of the spring 62. The wings 116 will preferably be of substantial length, as shown, so that the user has substantial leverage in effecting the endwise movement of the shaft 58 and sensitivity for controlling the amount of shaft movement accurately. This affords a close control and a good "feel" insofar as line feathering or pay-out during casting is concerned.

The pick-up cone 70, 72 carries a pick-up pin by means of which the line is wound upon the spool and retrieved. This pick-up pin may be of the construction illustrated in FIG. 3. Thus the wall 70 of the cone may have a pair of ears 130 struck therefrom to define a C-shaped guide portion, as illustrated in FIG. 4, to receive and guide opposite reduced width marginal portions 132 of a member 134 which extends substantially radially relative to the cone and whose inner end may bear against the cam 56 of the sleeve 50. The outer end 136 of member 134 projects through an aperture in the cone skirt 72 to terminate in close proximity to the sheath skirt 88, as seen in FIG. 1, when the member 134 bears against the part of the cam 56 of maximum radial displacement. Spring means, such as leaf springs 138, serve to press the member 134 against the cam 56, said spring engaging the cone skirt 72 at its free ends. In the form shown, springs 138 and member 134 are welded and integral, but it will be understood that such an arrangement is not essential and that any means may be employed to exert spring pressure upon the pin. The spring will be so stressed in the operative position that upon axial movement of the cone to disengage the member 134 of the pin from the bushing 50, the pin will be moved radially inwardly to a position in which the spacing between the inner end of pin part 134 and the axis of the shaft 58 will be slightly greater than the minimum radial displacement of the cam 56. Consequently, the pin part 134 will reengage the cam 56 to return to the FIG. 1 position upon release of the cam 110 and rotation of the crank 36 to start line retrieve. The width of the cam 56 is less than the thickness of the pin part 134 so that upon completion of the travel of the pin outwardly upon the cam surface after commencement of line retrieving operation the pin part 134 will engage the cylindrical outer surface of the bearing bushing 50 and will ride thereon continuously thereafter during the retrieving operation.

The clutch or drag mechanism of this reel is best illustrated in FIGS. 1 and 2. A stud 140 is slidable in an aperture in the top wall 14 of the housing adjacent to the front wall 18 and has an enlarged head 142 at its inner end. The outer end of the stud projects above the top surface of the top wall and is screw-threaded and mounts nut 144. The nut 144 is preferably centrally recessed to receive the head of a screw 146 whose shank is screw-threaded in an axial bore in the upper end of the shank of the stud 140. A friction disk 148 bears against the inner surface of the head 142. A gear 150 is journaled upon the stud 140 and passes through an aperture 152 in the front wall 18 to mesh with the annular gear 82 upon the rear wall 80 of the spool. A second friction disk 153 encircles the stud and bears against the top surface of the gear 150, and a leaf spring or spring disk 154 is interposed between the top friction disk 153 and the bottom surface of the top wall 14 of the reel frame.

In the position of the parts shown in FIG. 1 wherein a gear 150 is positioned in the lower portion of the opening 152 and meshes with the inner portion of the gear ring 82, said gear is substantially free from retarding friction so that it may rotate upon the shaft 140 without substantial restraint upon the rotation of the line spool. As the nut 144 is rotated in tightening direction to draw the stud 140 upwardly, the spring 154 is flexed and progressive tightening results in progressively increasing frictional engagement of the friction disks 148 and 153 with the opposite faces of the gear 150. This increased friction tends to resist free rotation of the gear 150 and to impose a braking action or drag action upon the line spool. The teeth of the gear 82 upon the line spool will be of sufficient radial dimension so as to accommodate the bodily movement of the gear 150 relative thereto without destroying the meshing engagement of the gear teeth 82 and 150.

The reel is provided with a novel anti-reverse construction, as best illustrated in FIGS. 1 and 7 to 10. The upper rear portion of the frame is preferably beveled or inclined, as seen in FIG. 1, and has a bore 160 therein whose axis preferably intersects the axis of the crank shaft 34. A stud 162 is rotatably mounted in the bore 160 and is provided with an annular flange 164 intermediate its ends and providing an abutment for a spring 166, such as a leaf spring, whose opposite ends bear against the inner face of the reel frame 10. Longitudinally inwardly projecting from the flange 164 is a substantially V-shaped portion as viewed from its end and as best seen in FIG. 8. The V-shaped portion has a pair of longitudinally extending flanges 168 extending at an angle to each other and preferably converging from portions thereof adjacent flange 164 toward their free margins, said convergence being substantially complementary to the angle of taper of the teeth 46 of the gear 42. The stud 162 has a reduced non-circular outer end portion 170 which serves to mount a lever or finger piece 172 which is secured to the stud by the head of a screw 174 received in a socket in the outer end of the stud. The finger piece or lever 172 has a lug 176 projecting from the inner face thereof and adapted to register with an arcuate groove in the face of the housing 10 and preferably of the character shown in FIGS. 9 and 10. Thus the groove 178 is of progressively increasing depth for one end thereof at 180 and a locking socket 182 is located adjacent the shallow end of the groove 178.

The parts are so positioned and oriented that the gear teeth 46 will be engaged by the longitudinal edge of one of the flanges 168 in one rotative position thereof regardless of the location of that gear at the right, as illustrated in FIG. 2, or at the left thereof, when the lug 176 seats in the recess 182 or in the deep end 180 of the groove 178. The engagement is such that rotation of the gear is permitted in one direction to produce a clicking action but is prevented in the opposite direction. Hence the anti-reverse functioning of the device. When the lug 176 is received in the groove 178, rotation of the finger piece 172 will serve to vary the axial positioning of the stud as the lug 176 rides up the inclined portion of the groove, thereby varying the click action produced. The lug will remain in any position it is set by reason of the action of the spring 166 which is flexed as the stud shifts outwardly in its receiving bore. When the stud 176 seats in the recess 182, the angular position of the flanges 168 relative to the gear 46 will be such that flanges 168 are held clear of the gear teeth 46.

In order that the "feel" of feathering the line upon play-out may be more plain to the user of the reel, and particularly to a user with little experience, a construction of the character illustrated in FIGS. 14 to 16 may be employed in association with the cam 110. Thus the wall 16 of the frame may be provided with a recess 190 preferably of substantially arcuate form, as illustrated in FIGS. 15 and 16, and substantially concentric with the pivot pin 112. An elongated lug 192 may project into this recess 190 in spaced relation to the top edge thereof to confine between the same and said top recess edge the central portion 194 of a U-shaped spring having a pair of diverging spring arms 196. A pin 198 is carried by the cam 110 to project into the recess 190 between the spring arms 196. The pin 198 will be centered so that it is equispaced between the spring arms 196 when the end of the shaft 58 seats in the central deepest part of the cam recess 120. Movement of the cam 110 to shift the cone to the position shown in FIG. 5 where the pin 106 first comes in contact with the end wall 98 of the outer sheath is required before the pin 198 contacts a spring arm 196. Thus the FIG. 15 position of the cam 110 produces the cone adjustment shown in FIG. 5. As further movement of the cam 110 occurs to increase the pressure acting upon the pin 106 to retard discharge of the line from the spool, the spring arm 196 must be flexed. This imparts progressively increasing resistance to the operation of the cam 110 which can be felt and sensed by inexperienced anglers so that they are able to orient the position of the cam 110 to the feathering action of the cone and the pin 106 for retardation of line play-out.

Figure 18:
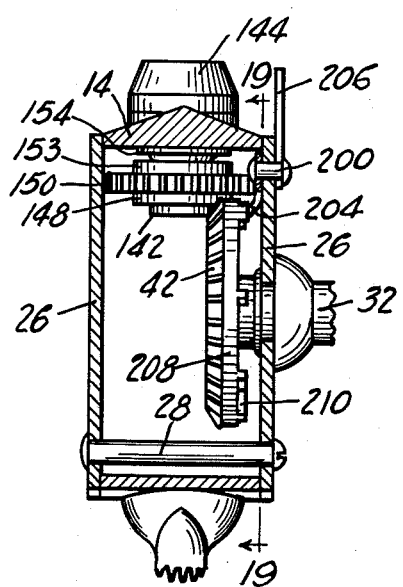
FIG. 18 is a transverse sectional view taken on line 18—18 of FIG. 17.
Figure 19:
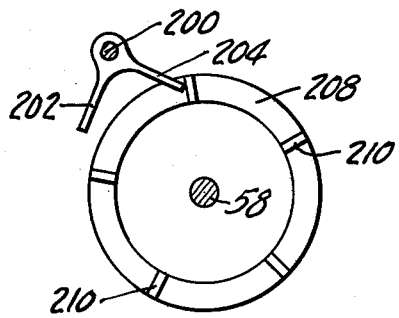
FIG. 19 is a fragmentary sectional view taken on line 19—19 of FIG. 18.

A modified form of anti-reverse means useful in association with a reel readily converted to left-hand operation but of less expensive construction than that hereinbefore described is illustrated in FIGS. 17 to 19. In this construction the side plate 26 of the reel casing which mounts the crank bushing 32 carries a pivot pin 200 to which is secured a leaf spring member of bowed shape and substantially arcuate form providing diverging legs or arm portions 202 and 204 which are bent to engage the rear face of the gear 42. An operating handle 206 is fixed on the outer end of the pin 200 to provide means for manipulating the members 202 and 204. The gear 42 fixedly carries a star wheel 208 projecting from its back and characterized by a plurality of spaced radial outwardly projecting teeth 210. The tips of the spring legs 202 and 204 are bent for substantially flat engagement with the star wheel 208. The arrangement is such that in the setting shown in FIG. 17 counterclockwise rotation of the gear 42 will be permitted by the fact that spring arm 202 is clear of the star wheel and the end of the spring arm 204 is deflected or cammed outwardly by the star wheel teeth 210. Clockwise rotation of gear 42 will result in abutment of a star wheel tooth 210 with the end of the spring leg 204, thus preventing rotation of the gear in that direction.

While the preferred embodiments of the invention have been illustrated and described herein, it will be understood that changes in the construction may be made within the scope of the appended claims without departing from the spirit of the invention.

We claim:

1. A fishing reel comprising a frame having a pair of spaced bearings, a main shaft journaled and axially shiftable in said spaced frame bearings, a spring urging said shaft to a normal longitudinal position, means for rotating said shaft including gears located between said bearings, a pick-up cone mounted on said shaft, a cup-shaped sheath carried by said frame and having a central line aperture, a spool rotatable in said sheath and partially encircled by said cone, means normally restraining said spool from rotation, and cam means carried by the rear of said frame externally of said bearings and actuable to shift said shaft axially, said cam means being rotatable on an axis parallel to said shaft.

2. A fishing reel, comprising a frame having a pair of spaced bearings, a main shaft journaled and axially shiftable in said spaced frame bearings, a spring urging said shaft to a normal longitudinal position, means for rotating said shaft including gears located between said bearings, a pick-up cone mounted on said shaft, a cup-shaped sheath carried by said frame and having a central line aperture, a spool rotatable in said sheath and partially encircled by said cone, means retarding rotation of said spool and cam means rotatable on an axis parallel to said shaft at the rear of said frame externally of said frame and actuable to shift said shaft axially, said cone mounting a radially shiftable pick-up pin, a spring for normally retracting said pin inwardly, one of said bearings constituting a bushing journaling said spool and including an eccentric end portion engageable by said pin upon axial sliding of said shaft from extended toward normal position.

3. A fishing reel comprising a frame defining a chamber and having bearings at opposite ends of said chamber, a main shaft journaled and axially shiftable in said spaced frame bearings, a spring in said chamber urging said shaft to a normal longitudinal position, means for rotating said shaft including parts in said chamber, a pick-up cone mounted on said shaft, a cup-shaped sheath carried by said frame and having a central line aperture, a spool rotatable in said sheath and partially encircled by said cone, means normally retarding rotation of said spool, and external cam means carried by the rear of said frame and rotatable on an axis parallel to said shaft to shift said shaft axially, said sheath having an end wall with an annular portion engageable by the end of said cone upon endwise shifting of said main shaft and a central outwardly projecting apertured portion.

4. A fishing reel comprising a frame, a main shaft journaled and axially shiftable in said frame, a spring urging said shaft to a normal longitudinal position, means for rotating said shaft, a pick-up cone mounted on said shaft, a cup-shaped sheath carried by said frame and having a central line aperture, a spool rotatable in said sheath and partially encircled by said cone, and cam means carried by the rear of said frame and actuable to shift said shaft axially, and a spring pressed pin projecting longitudinally from the outer end of said cone in radially spaced relation to the line aperture of said sheath and yieldingly engageable with said sheath as said cone approaches said sheath upon axial movement of said shaft from normal position.

5. A fishing reel comprising a frame, a main shaft journaled and axially shiftable in said frame, a spring urging said shaft to a normal longitudinal position, means for rotating said shaft, a pick-up cone mounted on said shaft, a cup-shaped sheath carried by said frame and having a central line aperture, a spool rotatable in said sheath and partially encircled by said cone, and cam means carried by the rear of said frame and actuable to shift said shaft axially, said cone having an end wall confronting the end of said sheath and having an eccentric aperture, a pin shiftable endwise in said cone aperture, and spring means carried by said cone and normally projecting said pin outwardly relative to said cone end wall and engageable with said sheath upon axial movement of said shaft from normal position.

6. A fishing reel comprising a frame, a main shaft journaled and axially shiftable in said frame, a spring urging said shaft to a normal longitudinal position, means for rotating said shaft, a pick-up cone mounted on said shaft, a cup-shaped sheath carried by said frame and having a central line aperture, a spool rotatable in said sheath and partially encircled by said cone, and cam means carried by the rear of said frame and actuable to shift said shaft axially, said cone having an end wall confronting the end of said sheath and having an eccentric aperture, a pin shiftable endwise in said cone aperture, and a leaf spring mounting said pin and secured to said cone spaced from said pin, said pin being engageable with said sheath upon axial movement of said shaft from normal position.

7. A fishing reel comprising a frame, a main shaft journaled and axially shiftable in said frame, a spring urging said shaft to a normal longitudinal position, means for rotating said shaft, a pick-up cone mounted on said shaft, a cup-shaped sheath carried by said frame and having a central line aperture, a spool rotatable in said sheath and partially encircled by said cone, and cam means carried by the rear of said frame and actuable to shift said shaft axially, said cam means being pivoted centrally relative to the sides of and externally at the rear of said frame spaced from and on an axis parallel to said main shaft and having a cam groove receiving the end of said shaft and symmetrical relative to a center point, and finger engaging projections on said cam means for projecting at opposite sides of said frame.

8. A fishing reel comprising a frame, a main shaft journaled and axially shiftable in said frame, a spring urging said shaft to a normal longitudinal position, means for rotating said shaft, a pick-up cone mounted on said shaft, a cup-shaped sheath carried by said frame and having a central line aperture, a spool rotatable in said sheath and partially encircled by said cone, and external shiftable means carried by the rear of said frame and rotatable on an axis parallel to said shaft to shift said shaft axially, and second spring means carried by said frame engageable by and progressively resisting operation of said shiftable means after predetermined initial endwise movement of said shaft, said shiftable means including an abutment engageable with said second spring in a selected range of positions thereof.

9. A fishing reel comprising a frame, a main shaft journaled and axially shiftable in said frame, a spring urging said shaft to a normal longitudinal position, means for rotating said shaft, a pick-up cone mounted on said shaft, a cup-shaped sheath carried by said frame and having a central line aperture, a spool rotatable in said sheath and partially encircled by said cone, external actuating means carried by the rear of said frame and actuable to shift said shaft axially, and second spring means carried by said frame and engageable by said actuating means after predetermined partial actuation of said actuating means to resist movement of said actuating means, said second spring being spaced from said actuating means when said shaft is in normal position.

10. A fishing reel comprising a frame, a main shaft journaled and axially shiftable in said frame, a spring urging said shaft to a normal longitudinal position, means for rotating said shaft, a pick-up cone mounted on said shaft, a cup-shaped sheath carried by said frame and having a central line aperture, a spool rotatable in said sheath and partially encircled by said cone, external actuating means carried by the rear of said frame and actuable to shift said shaft axially, a spring-pressed member projecting longitudinally from the outer end of said cone and engageable with said sheath intermediate the maximum endwise movement of said shaft to retard discharge of line at said aperture, and spring means carried by said frame and so positioned in the path of and engageable by said actuating means to increase resistance to operation of said actuating means after said spring pressed member engages said sheath.

References Cited in the file of this patent
UNITED STATES PATENTS

| | | |
|---|---|---|
| 2,587,257 | Weisblatt | Feb. 26, 1952 |
| 2,644,647 | Denison et al. | July 7, 1953 |
| 2,668,025 | Hull | Feb. 2, 1954 |
| 2,675,192 | Hull | Apr. 13, 1954 |
| 2,690,309 | Cuonz et al. | Sept. 28, 1954 |
| 2,772,839 | Morton | Dec. 4, 1956 |
| 2,775,417 | Freund | Dec. 25, 1956 |
| 2,862,679 | Denison et al. | Dec. 2, 1958 |
| 2,903,202 | Sarah | Sept. 8, 1959 |